(12) United States Patent
Igarashi et al.

(10) Patent No.: US 9,707,856 B2
(45) Date of Patent: Jul. 18, 2017

(54) VEHICLE POWER MANAGEMENT DEVICE

(71) Applicant: Mitsubishi Electric Corporation, Chiyoda-ku (JP)

(72) Inventors: Yuji Igarashi, Tokyo (JP); Katsuya Kawai, Tokyo (JP); Yukio Goto, Tokyo (JP); Masahiko Tanimoto, Tokyo (JP); Yoshito Nishita, Tokyo (JP); Kazushi Shirasawa, Tokyo (JP); Takanori Matsunaga, Tokyo (JP); Akinobu Sugiyama, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/773,944

(22) PCT Filed: Nov. 8, 2013

(86) PCT No.: PCT/JP2013/080274
§ 371 (c)(1),
(2) Date: Sep. 9, 2015

(87) PCT Pub. No.: WO2014/141532
PCT Pub. Date: Sep. 18, 2014

(65) Prior Publication Data
US 2016/0016484 A1 Jan. 21, 2016

(30) Foreign Application Priority Data
Mar. 11, 2013 (JP) .................................. 2013-047443

(51) Int. Cl.
*B60L 11/18* (2006.01)
*B60L 1/00* (2006.01)
(Continued)

(52) U.S. Cl.
CPC ............. *B60L 11/1862* (2013.01); *B60L 1/00* (2013.01); *B60L 11/02* (2013.01);
(Continued)

(58) Field of Classification Search
CPC combination set(s) only.
See application file for complete search history.

(56) References Cited

U.S. PATENT DOCUMENTS 7,034,482 B2  4/2006  Komiyama et al.
8,417,403 B2 * 4/2013  Iida .................... H01M 10/486
                                                    180/65.29
(Continued)

FOREIGN PATENT DOCUMENTS

CN    2582249 Y    10/2003
CN    1944098 A     4/2007
(Continued)

OTHER PUBLICATIONS

Japanese Office Action issued May 17, 2016 in Japanese Application No. 2015-505228 (with Partial English Translation).
(Continued)

*Primary Examiner* — Edward J Pipala
(74) *Attorney, Agent, or Firm* — Oblon, McClelland, Maier & Neustadt, L.L.P.

(57) ABSTRACT

A vehicle power management device managing: a vehicle path information generation device generating a vehicle travel path; a drive assembly consuming power to drive the vehicle; a power generator; an electrical load device group; a high-voltage storage device storing power for driving the vehicle; a low-voltage storage device storing power for operating the electrical load device group; and a DC voltage conversion and output device converting voltage of power stored in the high-voltage storage device to generate DC voltage for operating the electrical load device group, and
(Continued)

outputting the DC voltage, and controlling electric energy flow in the vehicle. The vehicle power management device controls output of the DC voltage conversion and output device so that a filling rate of the low-voltage storage device is between lower and upper limits of a range in which a charge and discharge speed is equal to or higher than a predetermined value.

11 Claims, 9 Drawing Sheets

(51) Int. Cl.
*H01M 10/44* (2006.01)
*H02J 7/34* (2006.01)
*H02J 7/00* (2006.01)
*B60L 11/02* (2006.01)
*B60W 10/08* (2006.01)
*B60W 10/26* (2006.01)
*B60W 50/00* (2006.01)
*H01M 10/42* (2006.01)

(52) U.S. Cl.
CPC .......... *B60L 11/1859* (2013.01); *B60W 10/08* (2013.01); *B60W 10/26* (2013.01); *B60W 50/0097* (2013.01); *H01M 10/425* (2013.01); *H01M 10/44* (2013.01); *H02J 7/0022* (2013.01); *H02J 7/34* (2013.01); *B60L 2240/545* (2013.01); *H01M 2010/4271* (2013.01); *H01M 2220/20* (2013.01); *Y02T 10/705* (2013.01); *Y02T 10/7005* (2013.01); *Y02T 10/7055* (2013.01)

(56) References Cited

U.S. PATENT DOCUMENTS

| | | | |
|---|---|---|---|
| 8,447,452 | B2 | 5/2013 | Katoh et al. |
| 8,963,365 | B2* | 2/2015 | King .................. B60L 11/1857 174/255 |
| 9,007,001 | B2* | 4/2015 | Sugiyama ............... B60L 11/14 307/9.1 |
| 2009/0101421 | A1* | 4/2009 | Oyobe .................... B60K 6/26 180/65.29 |
| 2010/0289447 | A1 | 11/2010 | Dobson et al. |
| 2012/0306263 | A1 | 12/2012 | Tashiro et al. |
| 2014/0132071 | A1 | 5/2014 | Funakubo et al. |

FOREIGN PATENT DOCUMENTS

| | | |
|---|---|---|
| DE | 10 2008 041 539 A1 | 3/2010 |
| JP | 2005 253126 | 9/2005 |
| JP | 2011 160613 | 8/2011 |
| JP | 2012 46171 | 3/2012 |
| JP | 2012 115065 | 6/2012 |
| JP | 2012 249462 | 12/2012 |
| WO | WO 2010/023004 A1 | 3/2010 |
| WO | WO 2013/027272 A1 | 2/2013 |

OTHER PUBLICATIONS

International Search Report Issued Jan. 7, 2014 in PCT/JP13/80274 Filed Nov. 8, 2013.
International Preliminary Report on Patentability issued Sep. 24, 2015 in PCT Application No. PCT/JP2013/080274.
Combined Chinese Office Action and Search Report issued Jul. 22, 2016 in Patent Application No. 201380074509.4 (submitting English translation of the Search Report).
Office Action issued Apr. 5, 2017 in Chinese Patent Application No. 201380074509.4 (with English translation).

* cited by examiner

| TIME (t) | TRAVEL DISTANCE (m) | TRAVEL PATH INFORMATION | | | | | DRIVE POWER CONSUMPTION (kW) | GENERATED POWER (kW) | ELECTRICAL LOAD POWER CONSUMPTION (kW) |
|---|---|---|---|---|---|---|---|---|---|
| | | LATITUDE AND LONGITUDE | ADVANCING DIRECTION | PLACE | SPEED LIMIT (km/h) | GRADIENT | | | |
| 1 | 0~100 | X0, Y0 | DIRECT ADVANCE | SINGLE ROAD | 60 | RISING GRADIENT OF 5 DEGREES | 14 | 0 | 0 |
| 2 | 100~200 | X1, Y1 | LEFT TURN | INTERSECTION | 60 | FALLING GRADIENT OF 15 DEGREES | 2 | 9 | 1 |
| 3 | 200~300 | X2, Y2 | RIGHT TURN | T-INTERSECTION | 40 | 0 DEGREES | 14 | 3 | 1 |
| 4 | 300~400 | X3, Y3 | DIRECT ADVANCE | SINGLE ROAD | 40 | 0 DEGREES | 8 | 0 | 0 |
| 5 | 400~500 | X4, Y4 | DIRECT ADVANCE | RAILROAD CROSSING | 40 | 0 DEGREES | 8 | 2 | 1 |
| ... | ... | ... | ... | ... | ... | ... | ... | ... | ... |
| n | 900~1000 | X9, Y9 | DIRECT ADVANCE | TUNNEL | 100 | 20 DEGREES | 24 | 0 | 2 |

F I G. 4

<CONVERSION CONDITION EXAMPLES : IN CASE WHERE RESOLUTION OF TRAVEL DISTANCE IS 100 m>

▪DRIVE POWER       2 kW EVERY 10 KILOMETERS PER HOUR (AIR RESISTANCE AND ROAD SURFACE FRICTION)
 CONSUMPTION       2 kW EVERY RISING GRADIENT OF 5 DEGREES
                   2 kW EACH TIME RIGHT OR LEFT TURN IS MADE

▪GENERATED POWER   2 kW EVERY FALLING GRADIENT OF 5 DEGREES
                   KILOMETERS PER HOUR ÷ 20 kW EACH TIME RIGHT OR LEFT TURN IS MADE (EACH TIME SPEED DECREASES)

▪ELECTRICAL LOAD   1 kW EACH TIME RIGHT OR LEFT TURN IS MADE
 POWER CONSUMPTION 2 kW EACH TIME HEADLIGHTS ARE TURNED ON

VEHICLE POWER MANAGEMENT DEVICE

TECHNICAL FIELD

The present invention relates to a vehicle power management device for managing power for driving electrical loads in a vehicle.

BACKGROUND ART

In recent years, electric vehicles powered by electric energy have been put into practical use to reduce carbon dioxide emissions and achieve efficient utilization of energy. Electric vehicles, however, have a short cruising range of approximately 100 km to 200 km when they are in full charge as the energy density of batteries for electric vehicles is lower than that of gasoline, and the cruising range further decreases through power consumption by electrical loads such as an air conditioner.

To solve this problem, technology for promoting energy saving in the electrical loads in the electric vehicles to reduce power consumption during traveling and to thereby extend the cruising range has been proposed.

As such technology, Patent Document 1 discloses a vehicle power management system that calculates a market price of electricity (an electricity price) from a power supply-demand situation (total power consumption of electrical loads, power generation cost, and storage cost) of a traveling vehicle, and notifies various electrical loads installed in the vehicle of the electricity price, for example.

In the vehicle power management system disclosed in Patent Document 1, the electrical loads installed in the vehicle can indirectly grasp the power supply-demand situation of the vehicle from the electricity price, and, by setting proper electricity purchasing ability in the electrical loads, energy-saving operation of the electrical loads can be achieved in accordance with the power supply-demand situation of the traveling vehicle, for example, by transitioning to operation in a power save mode when the electricity price is high.

PRIOR ART DOCUMENT

Patent Document

Patent Document 1: Japanese Patent Application Laid-Open Publication No. 2012-046171

SUMMARY OF INVENTION

Problems to be Solved by Invention

In the above-mentioned technology disclosed in Patent Document 1, the individual electrical loads achieve energy-saving operation at their discretion in accordance with the market price of electricity, i.e., the power supply-demand situation at the moment, and thus it is difficult to control a peak value of an output load imposed on a storage device, and a power supply loss (e.g., a loss of voltage generation of 12 V supplied to the loads or a power loss caused by internal resistance produced when power is supplied from a battery) cannot be reduced.

The present invention has been conceived to solve problems as mentioned above, and aims to provide technology for suppressing load concentration on the storage device during traveling of the vehicle to suppress a power loss caused in the storage device, and reducing a loss of power supply to the electrical loads.

Means for Solving the Problems

A vehicle power management system device according to an embodiment manages: a vehicle path information generation device that generates a travel path of a vehicle; a drive assembly that consumes power to drive the vehicle; a power generator; a plurality of electrical loads: a first storage device that stores therein power for driving the vehicle; a second storage device that stores therein power for operation of the electrical loads; and a DC voltage conversion and output device that converts voltage of the power stored in the first storage device to generate DC voltage for operation of the electrical loads, and outputs the DC voltage, and for controlling a flow of electric energy in the vehicle, wherein the vehicle power management device controls output of the DC voltage conversion and output device so that a filling rate of the second storage device is between a lower limit and an upper limit of a range in which a charge and discharge speed is equal to or higher than a predetermined value.

Effects of Invention

According to the vehicle power management device according to an embodiment a storage state of the second storage device can be controlled so that the second storage device can be charged with high efficiency (in a short time).

BRIEF DESCRIPTION OF DRAWINGS

FIG. 1 is a block diagram showing the configuration of a vehicle power management system in Embodiments 1 to 3 according to the present invention.

FIG. 3 shows prediction results acquired by predictors of the vehicle power management system in Embodiments 1 to 3 according to the present invention.

FIG. 4 shows conversion conditions of drive power consumption, generated power, and electrical load power consumption in Embodiments 1 to 3 according to the present invention.

DESCRIPTION OF EMBODIMENTS

Embodiment 1

Device Configuration

Figure 1:
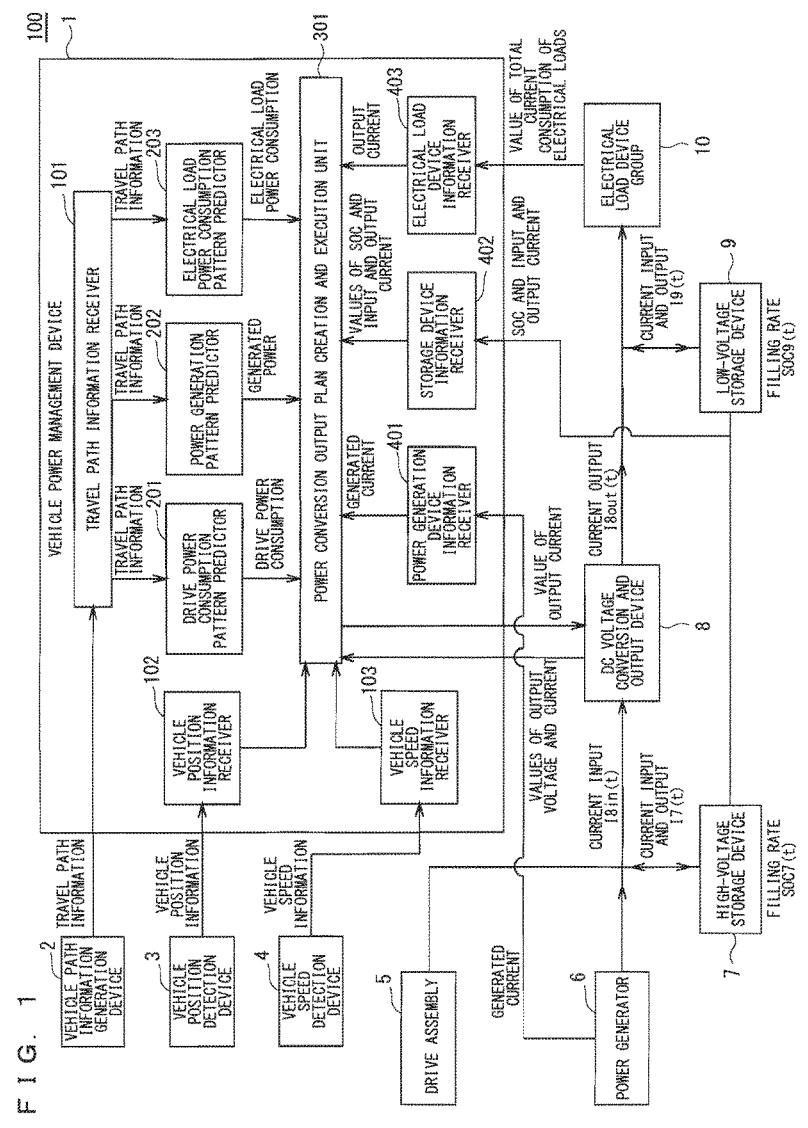
Figure 2:
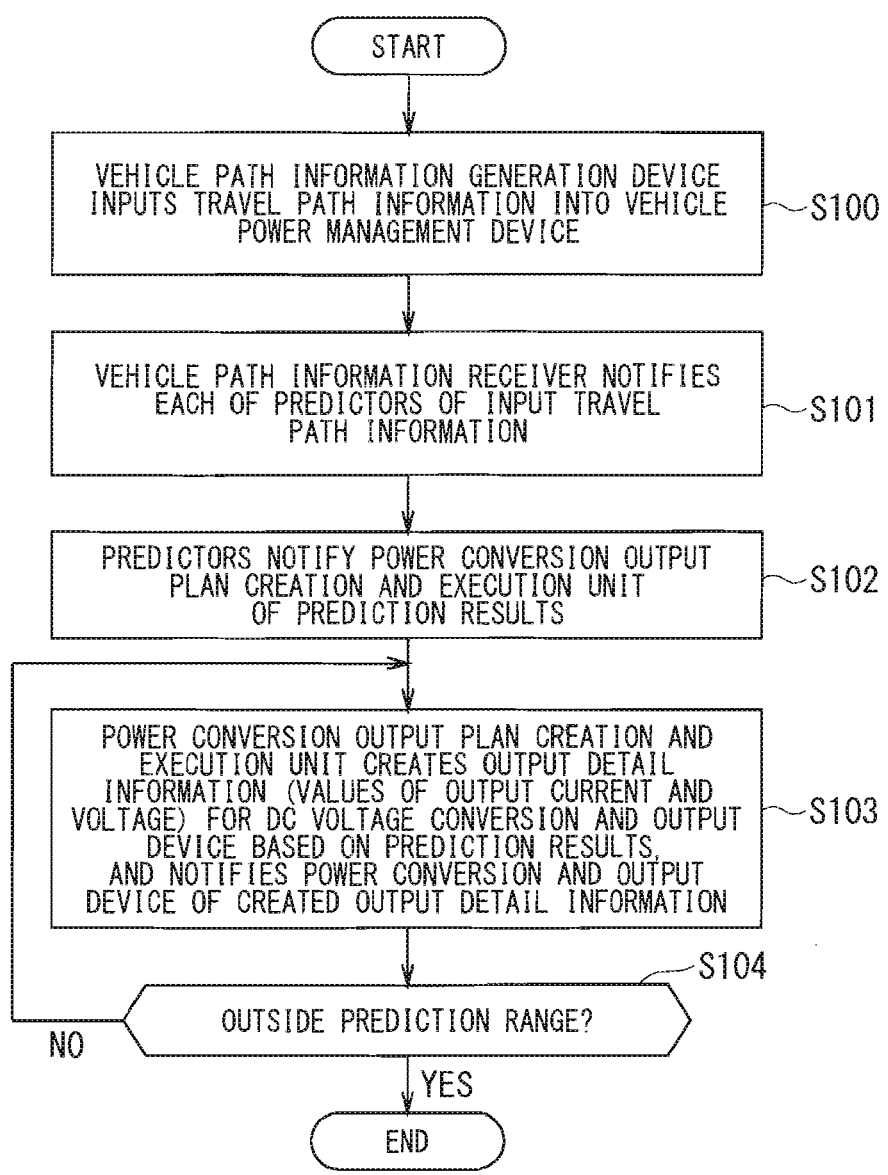
FIG. 2 is a flow chart for describing operation of the vehicle power management system in Embodiments 1 to 3 according to the present invention.

FIG. 1 is a block diagram showing the configuration of a vehicle power management system 100 in Embodiment 1 according to the present invention.

The vehicle power management system 100 shown in FIG. 1 includes a vehicle power management device 1, a vehicle path information generation device 2, a vehicle position detection device 3, a vehicle speed detection device 4, a drive assembly 5, a power generator 6, a high-voltage storage device 7, a DC voltage conversion and output device 8, a low-voltage storage device 9, and an electrical load device group 10. The vehicle power management device 1 controls the flow of electric energy in the vehicle. The vehicle path information generation device 2 generates and outputs a travel path of the vehicle. The vehicle position detection device 3 detects an absolute position or a relative position of the vehicle, such as the latitude and the longitude of the GPS and an accumulative travel distance. The vehicle speed detection device 4 detects the speed of the vehicle, such as a value of a vehicle-speed pulse. The drive assembly 5 consumes power of a motor and the like for driving. The power generator 6 is an alternator or a regenerative motor, for example. The high-voltage storage device 7 is a lithium ion battery, for example, and is used as a drive energy source for the vehicle. The DC voltage conversion and output device 8 generates and outputs a low voltage of 12 V to 14 V supplied from the high-voltage storage device 7 to the electrical load device group 10. The low-voltage storage device 9 is a lead-acid battery, for example, and is connected along a power supply line to accessories. The electrical load device group 10 (typically referred to as accessories and including a plurality of electrical load devices) includes an air conditioner and an electric power steering (EPS), for example.

The vehicle power management device 1 includes, as information receivers, a travel path information receiver 101 that receives travel path information output from the vehicle path information generation device 2, a vehicle position information receiver 102 that receives vehicle position information output from the vehicle position detection device 3, and a vehicle speed information receiver 103 that receives vehicle speed information output from the vehicle speed detection device 4.

The vehicle power management device 1 also includes, as predictors, a drive power consumption pattern predictor 201 that predicts, based on the travel path information, drive power consumption that is power consumed by the drive assembly 5, a power generation pattern predictor 202 that predicts, based on the travel path information, power generated by the power generator 6, and an electrical load power consumption pattern predictor 203 that predicts, based on the travel path information, electrical load power consumption that is power consumed by the electrical load device group 10.

The vehicle power management device 1 also includes, as device information receivers, a power generator information receiver 401 that detects a power generation state (presence or absence of generated power and current and voltage of generated power) of the power generator 6 and outputs it as power generator information, a storage device information receiver 402 that detects storage states (values of state of charge (SOC) and values of input and output current and voltage) of the high-voltage storage device 7 and the low-voltage storage device 9 and outputs them as storage device information, and an electrical load device information receiver 403 that detects a value of current of total power consumption of the electrical load device group 10 and outputs it as electrical load device information.

The vehicle power management device 1 also includes a power conversion output plan creation and execution unit 301 that creates an output plan (a control plan) for the DC voltage conversion and output device 8 based on the prediction results (the drive power consumption, the generated power, and the electrical load power consumption) acquired by the above-mentioned predictors and device information (the power generator information, the storage device information, and the electrical load device information) output from the device information receivers in such a manner that that the sum of a power loss ($L7(t)$) in the high-voltage storage device 7, a power loss ($L9(t)$) in the low-voltage storage device 9, and a power loss ($L8(t)$) in the DC voltage conversion and output device 8 is the smallest, and controls the DC voltage conversion and output device 8 based on the created output plan. The power losses $L7(t)$, $L8(t)$, and $L9(t)$ indicate power losses at time t.

<Operation>

The following describes operation of the vehicle power management system 100 with use of FIGS. 2 to 4 with reference to FIG. 1.

FIG. 2 is a flow chart for describing power conversion output plan creation and execution processing performed by the vehicle power management device 1.

When an ignition key is turned on to operate an electrical system of the vehicle and to thereby start operation of the vehicle power management system 100, the vehicle path information generation device 2 inputs the travel path information into the vehicle power management device 1 (step S100).

In this travel path information, a road is expressed by a plurality of nodes, and each of the nodes includes information on coordinates of a relative position (an accumulative travel distance from a position at which the travel path information is input), coordinates of an absolute position (the latitude and the longitude of the GPS), a node attribute (an intersection, a T-intersection, a railroad crossing, and a tunnel), an advancing direction at the node (a direct advance, a right turn, a left turn, and a U-turn), and a legal speed between nodes (in kilometers per hour). The vehicle path information generation device 2 may acquire the coordinates of the relative position and the coordinates of the absolute position from the vehicle position detection device 3, but the vehicle path information generation device 2 may include a GPS sensor therein. The vehicle path information generation device 2 may also include a speed sensor therein.

The vehicle path information generation device 2 herein creates, as the travel path information, either the most probable path (MPP) that is a path likely to be followed specified by the advanced driver assistance systems interface (ADAS) or a path from the current position to a destination set by a user with respect to a car navigation device and the like, and inputs the created travel path information into the vehicle power management device 1.

The above-mentioned MPP is created and output as the travel path information by the vehicle path information generation device 2 without setting a destination.

The vehicle path information generation device 2 may create and input the travel path information into the vehicle power management device 1 only once before the start of traveling, or may create and input the travel path information at any timing (when the most probable path MPP that is the path likely to be followed or the path to the destination is updated, a predetermined time period has passed, or the vehicle has traveled a predetermined distance) during traveling. The vehicle power management device 1 uses the latest travel path information input from the vehicle path information generation device 2.

The travel path information receiver 101 then notifies each of the drive power consumption pattern predictor 201, the power generation pattern predictor 202, and the electrical load power consumption pattern predictor 203 of the input travel path information (step S101).

The drive power consumption pattern predictor 201, the power generation pattern predictor 202, and the electrical load power consumption pattern predictor 203 respectively predict the drive power consumption, the generated power, and the electrical load power consumption based on the travel path information, and notifies the power conversion output plan creation and execution unit 301 of the prediction results (step S102).

Certain prediction accuracy is herein maintained in prediction performed by each of the drive power consumption pattern predictor 201, the power generation pattern predictor 202, and the electrical load power consumption pattern predictor 203, the drive power consumption, the generated power, and the electrical load power consumption are predicted for each legal speed (speed limit), road gradient (rising gradient and falling gradient), and advancing direction (direct advance, right turn, and left turn) in accordance with a predetermined travel distance, and the prediction results are arranged in line with the travel path of the vehicle so that the relations among the drive power consumption, the generated power, and the electrical load power consumption are easily seen.

For example, as shown in FIG. 3, the prediction results are arranged so that the drive power consumption, the generated power, and the electrical load power consumption are associated with one another for each section of the travel distance. That is to say, in FIG. 3, the drive power consumption is 14 kW, the generated power is 0 kW, and the electrical load power consumption is 0 kW in a section in which the travel distance is 0 m to 100 m.

As shown in FIG. 3, the longitude, the latitude, and the travel path information are shown for each section of the travel distance, and the travel path information includes information on an advancing direction of the vehicle, a place, a speed limit, and a road gradient.

The drive power consumption pattern predictor 201, the power generation pattern predictor 202, and the electrical load power consumption pattern predictor 203 herein respectively predict the drive power consumption, the generated power, and the electrical load power consumption based on conversion conditions as shown in FIG. 4.

That is to say, in a case where the resolution of the travel distance is 100 m, in prediction of the drive power consumption, power is assumed to be consumed by 2 kW every 10 kilometers per hour in flat land in consideration of air resistance and road surface friction, is assumed to be consumed by 2 kW every gradient of 5 degrees in a rising slope, and is assumed to be consumed by 2 kW each time a right or left turn is made.

In prediction of the generated power, power is assumed to be generated by 2 kW every gradient of 5 degrees in a falling slope, and is assumed to be generated by a value obtained by dividing kilometers per hour by 20 kW each time a right or left turn is made (each time the speed decreases).

In prediction of the electrical load power consumption, power is assumed to be consumed by 1 kW each time a right or left turn is made, and is assumed to be consumed by 2 kW each time headlights are turned on.

Weighting may be performed such that the drive power consumption increases by 2 kW each time the rising gradient increases by 5%, for example.

The power conversion output plan creation and execution unit 301 then creates output plan information (output conditions and a value of output current) based on the prediction results, and notifies the DC voltage conversion and output device 8 of the value of the output current (step S103).

A method for creating the output plan information according to Embodiment 1 is described herein. First, the vehicle position information is input from the vehicle position detection device 3 to the vehicle position information receiver 102, the vehicle speed information is periodically input from the vehicle speed detection device 4 to the vehicle speed information receiver 103, and the power conversion output plan creation and execution unit 301 can respectively acquire information on the position of the vehicle and information on the speed of the vehicle from the vehicle position information receiver 102 and the vehicle speed information receiver 103 at any time.

Similarly, a value of current at power generation is input from the power generator 6 to the power generator information receiver 401, and SOC7(t) and a value of current input and output I7(t) are input from the high-voltage storage device 7 and SOC9(t) and a value of current input and output I9(t) are input from the low-voltage storage device 9 to the storage device information receiver 402.

A value of total current consumption of the electrical loads is periodically input from the electrical load device group 10 to the electrical load device information receiver 403, and the power conversion output plan creation and execution unit 301 can respectively acquire a timing of power generation and the value of current generated by the power generator 6, the values of SOC and the values of input and output current of the high-voltage storage device 7 and the low-voltage storage device 9, and the value of total current consumption of the electrical load device group 10 from the power generator information receiver 401, the storage device information receiver 402, and the electrical load device information receiver 403.

The power conversion output plan creation and execution unit 301 outputs the value of the output current to the DC voltage conversion and output device 8, and the DC voltage conversion and output device 8 can output, to the power conversion output plan creation and execution unit 301, values of current and voltage being output.

Rated output of the high-voltage storage device 7 is represented by P7Max (=25 kW), and the power conversion output plan creation and execution unit 301 has this value in advance.

The generated power, the drive power consumption, and the electrical load power consumption predicted in step S102 are herein represented by P1(t), P2(t), and P3(t), respectively.

The power conversion output plan creation and execution unit 301 calculates, based on the prediction results of FIG. 3, for example, the time or position (t=n in FIG. 3) at which the following formula (1) is satisfied, and creates the output plan information in such a manner that the value of the output current of the DC voltage conversion and output device 8 is zero at the calculated time.

$$P2(t)+P3(t)-P1(t)>P7\text{Max}(=25\text{ kW}) \quad (1)$$

In this case, the power conversion output plan creation and execution unit 301 supplies power to (charges) the low-voltage storage device 9 while 0<t<n is satisfied so that SOC9(n) of the low-voltage storage device 9 satisfies the following formula (2) to enable power supply of a lower limit SOC9min of SOC9 and the electrical load power consumption P3(n).

$$SOC9(n)>(\Delta SOC9+1)SOC9\text{min} \quad (2)$$

In the above-mentioned formula (2), ΔSOC9 represents a value converted into a value of SOC of the low-voltage storage device 9, and, in a case where the low-voltage storage device 9 has a capacity P9max of 10 kwh, for example, ΔSOC9 is calculated so as to satisfy ΔSOC9=(P3(n)/P9max)×100=10% if P3(n) is 1 kwh.

It is desirable to charge the low-voltage storage device 9 in a case where the drive power consumption is small (e.g., in a case where n=2 in FIG. 3) so that the amount of current output from the high-voltage storage device 7 is small, but, if output of the high-voltage storage device 7 is equal to or smaller than the rated output P7Max, the low-voltage storage device 9 may be charged at all times until t=n is satisfied, or the low-voltage storage device 9 may be charged with necessary power immediately before t=n is satisfied (t=n−1), for example.

A method for predicting SOC9(n) of the low-voltage storage device 9 is described next. Values of output current and output voltage of the DC voltage conversion and output device 8 are respectively represented by I8(t) and V8(t), an integrated value P8 of output power of the DC voltage conversion and output device 8 is represented by P8=ΣV8(t)·I8(t), and a value obtained by converting the integrated value P8 into the value of SOC of the low-voltage storage device 9 is represented by SOC9charge.

In FIG. 3, total power consumption P10 of the electrical loads obtained by integrating power consumption of the electrical loads until the time t (=n) is represented by P10=ΣP10(t), and a value obtained by converting the total power consumption P10 into the value of SOC of the low-voltage storage device 9 is represented by SOC9discharge.

In a case where an initial value (e.g., a value at the start of traveling) of SOC of the low-voltage storage device 9 is represented by SOCinitial, SOC9(n) can be calculated by the following formula (3).

$$SOC9(n)=SOC9\text{initial}+SOC9\text{charge}-SOC9\text{discharge} \quad (3)$$

SOC9initial is obtained from the value of the output voltage V8 (t=0) at the start of traveling by the following formula (4).

$$SOC9\text{initial}=\alpha \cdot (V8(0)-V8\text{offset}) \quad (4)$$

V8offset is herein voltage of the low-voltage storage device 9 when SOC is 0%, and can be obtained from an experimental value, a spec sheet of the low-voltage storage device 9, and the like.

A coefficient α is a ratio of the value of SOC to a voltage difference of the low-voltage storage device 9, and can be obtained from an experimental value, the spec sheet of the low-voltage storage device 9, and the like.

Referring back to FIG. 2, the power conversion output plan creation and execution unit 301 judges whether the created output plan information is outside the range of the prediction results acquired from the drive power consumption pattern predictor 201, the power generation pattern predictor 202, and the electrical load power consumption pattern predictor 203 in step S102, i.e., whether the created output plan information deviates from the travel path input in step S100 (step S104). If the output plan information is outside the prediction range, it deviates from the travel path, and the series of processes is completed as further processes are unnecessary. On the other hand, if the output plan information falls within the prediction range, it does not deviate from the travel path, and processes in and after step S103 are repeated.

<Effects>

As described above, in the vehicle power management system according to Embodiment 1, in a case where the drive power consumption is large and the output load of the high-voltage storage device 7 is large, power supply from the high-voltage storage device 7 to the electrical load device group 10 is stopped (the output current of the DC voltage conversion and output device 8 is set to zero) to reduce the value of the output current of the high-voltage storage device 7 and reduce the power loss in the internal resistance thereof to thereby extend the cruising range of the vehicle.

That is to say, the storage device (a storage battery) has internal resistance R, and a power loss of R×I² (the square of a value of current) is caused at charge (input of current) and discharge (output of current). The cruising range of the vehicle can be extended by reducing the power loss.

The power loss generates heat, and causes degradation of the storage battery, and thus a rated value (recommended value) of charge and discharge current has been determined. Therefore, by reducing the value of the output current of the high-voltage storage device 7 as described above to keep the value of the discharge current of the high-voltage storage device 7 within the rated range, performance degradation (reduction in storage capacity) of the high-voltage storage device 7 can be suppressed, and reduction in travel distance of the vehicle can be suppressed.

Embodiment 2

A vehicle power management system in Embodiment 2 according to the present invention is described next. The vehicle power management system in Embodiment 2 has the same configuration as the vehicle power management system 100 shown in FIG. 1, and FIGS. 1 and 3, which are used in description of Embodiment 1, are also used in description of Embodiment 2. Embodiment 2 is based on the premise that the power conversion output plan creation and execution unit 301 can acquire the timing of power generation and the value of power (the value of current) generated by the power generator 6 from the power generator information receiver 401, as in Embodiment 1.

In Embodiment 1, in the case where output of the high-voltage storage device 7 is equal to or larger than a predetermined value, power supply from the high-voltage storage device 7 to a low-voltage side is stopped to suppress the power loss caused by the internal resistance of the high-voltage storage device 7 and other factors, but the power loss caused when the storage device is charged with power generated by the power generator 6 is not sufficiently suppressed.

In Embodiment 2, a method for suppressing the power loss caused when the storage device is charged with power generated by the power generator 6 to achieve efficient charge is described.

More specifically, efficiency of charge is increased by changing the process in step S103 of FIG. 2 in the method for use in the power conversion output plan creation and execution unit 301 for creating the output plan information, and only differences from Embodiment 1 are described below with reference to FIG. 2.

First, as in Embodiment 1, the drive power consumption pattern predictor 201, the power generation pattern predictor 202, and the electrical load power consumption pattern predictor 203 respectively predict the drive power consumption, the generated power, and the electrical load power consumption based on the travel path information, and notifies the power conversion output plan creation and execution unit 301 of the prediction results (step S102).

The power conversion output plan creation and execution unit 301 then creates the output plan information (the output conditions and the value of output current) based on the prediction results, and notifies the DC voltage conversion and output device 8 of the value of the output current (step S103).

That is to say, the power conversion output plan creation and execution unit 301 creates the output plan information for the DC voltage conversion and output device 8 in such a manner that SOC9(t) of the low-voltage storage device 9 satisfies the following formula (5).

$$SOC9a < SOC9(t) < SOC9b \quad (5)$$

Predetermined values are herein set in advance as SOC9a and SOC9b, and the speed (ampere per second) at which the low-voltage storage device 9 is charged is the highest in the range of the formula (5).

SOC9a and SOC9b can be acquired by the low-voltage storage device 9 from experimental values, a spec sheet of the low-voltage storage device 9, and the like, and indicate a lower limit and an upper limit of a range in which performance (e.g., a storage capacity) of the low-voltage storage device 9 is not degraded and charge and discharge efficiency is high (a charge and discharge speed is equal to or higher than a predetermined value).

Specifically, in a case where the prediction results of the electrical load device power consumption and SOC9(t) of the low-voltage storage device 9 acquired from the storage device information receiver 402 are used, the electrical load power consumption predicted in step S102 is represented by P3(t), and power supplied from the DC voltage conversion and output device 8 is represented by P8(t), a value ΔSOC9(t) of SOC of a difference in power (supplied power P8(t)−P3(t)) relative to the capacity of the low-voltage storage device 9 is defined by the following formula (6).

$$\Delta SOC9(t) = \{P8(t) - P3(t)\} \div P9\max \quad (6)$$

In the above-mentioned formula (6), P9max represents the capacity of the low-voltage storage device 9, and P3(t) is a value uniquely determined from FIG. 3.

In a case where SOC of the low-voltage storage device 9 when time t is n−1 is represented by SOC9(n−1), SOC9(n) of the low-voltage storage device 9 when time t is n is defined by the following formula (7).

$$SOC9(n) = SOC9(n-1) + \Delta SOC9(n) \quad (7)$$

The power conversion output plan creation and execution unit 301 controls a value of current output of the DC voltage conversion and output device 8 so that the following formula (8) is satisfied in a time period from the time t=n−1 to the time t=n.

$$SOC9a < SOC9(n) < SOC9b \quad (8)$$

More specifically, when the amount of power that the DC voltage conversion and output device 8 can output in the time period from the time t=n−1 to the time t=n is represented by P8available(n), the above-mentioned formula (8) can be expressed by the following formula (9).

$$P8\text{availablemin}(n) < P8\text{available}(n)$$
$$< P8\text{availablemax}(n) \quad (9)$$

In the case where the DC voltage conversion and output device 8 outputs the current I8(t) and the voltage V8(t), P8available(n) is calculated as Σ{I8(t)·V8(t)}, and the power conversion output plan creation and execution unit 301 controls the value of the current output of the DC voltage conversion and output device 8 so that the above-mentioned formula (9) is satisfied.

<Effects>

As described above, in the vehicle power management system according to Embodiment 2, the power conversion output plan creation and execution unit 301 keeps SOC9(t) within the range of formula (5) to control SOC of the low-voltage storage device 9 so that the low-voltage storage device 9 can be charged with high efficiency (in a short time).

That is to say, a charge device (a storage battery) can be charged with large power in a short time when a filling rate (SOC) thereof is low, but, when SOC is extremely low, current required by the electrical loads cannot be supplied and degradation of the battery is caused, and thus SOC is required to be kept within the predetermined range. The formula (5) specifies this range, and the predetermined range is a parameter acquired beforehand by characteristics of the battery.

By controlling SOC of the low-voltage storage device 9 in accordance with such a rule, the low-voltage storage device 9 can be charged with power generated by the power generator 6 with high efficiency (in a short time) without causing performance degradation (e.g., reduction in storage capacity) of the low-voltage storage device 9 in a case where an output instruction is provided to the DC voltage conversion and output device 8 at a timing at which the power generator 6 generates power.

When power is supplied to the electrical load device group 10 and the low-voltage storage device 9 via the DC voltage conversion and output device 8, a power supply time T×a power loss P per unit time is caused. The power loss P per unit time is proportional to the square of the value of the output current, and thus, by controlling the DC voltage conversion and output device 8 so that the value of output current I and the output time T are reduced, the power loss is reduced, and efficient charge can be achieved while the power loss is suppressed in the case where the low-voltage storage device 9 is charged with power generated by the power generator 6.

Power is not always supplied from the high-voltage storage device 7 to the low-voltage storage device 9, and thus the power loss caused in the DC voltage conversion and output device 8 can be reduced, leading to extension of the cruising range of the vehicle.

Embodiment 3

A vehicle power management system in Embodiment 3 according to the present invention is described next. The vehicle power management system in Embodiment 3 has the same configuration as the vehicle power management system 100 shown in FIG. 1, and FIGS. 1 and 3, which are used in description of Embodiment 1, are also used in description of Embodiment 3.

In Embodiment 1, power supply from the high-voltage storage device 7 to the low-voltage side is stopped in the case where output of the high-voltage storage device 7 is equal to or larger than the predetermined value to suppress the power loss caused by the internal resistance of the high-voltage storage device 7 and other factors, and, in Embodiment 2, the power loss caused when the storage device is charged with power generated by the power generator 6 is suppressed, but a power conversion loss caused in the DC voltage conversion and output device 8 is not sufficiently suppressed.

In Embodiment 3, a method for reducing the power conversion loss caused in the DC voltage conversion and output device 8 is described.

More specifically, the power conversion loss is reduced by changing the process in step S103 of FIG. 2 in the method for use in the power conversion output plan creation and execution unit 301 for creating the output plan information, and only differences from Embodiment 1 are described below with reference to FIG. 2.

First, as in Embodiment 1, the drive power consumption pattern predictor 201, the power generation pattern predictor 202, and the electrical load power consumption pattern predictor 203 respectively predict the drive power consumption, the generated power, and the electrical load power consumption based on the travel path information, and notifies the power conversion output plan creation and execution unit 301 of the prediction results (step S102).

The power conversion output plan creation and execution unit 301 then creates the output plan information (the output conditions and the value of output current) based on the prediction results, and notifies the DC voltage conversion and output device 8 of the value of the output current (step S103).

A value of input current, a value of output current, and power conversion efficiency of the DC voltage conversion and output device 8 are herein represented by I8in(t), I8out(t), and μ8, respectively. The power conversion efficiency is specified in a product specification, and herein indicates power conversion efficiency with respect to output current of a DC/DC converter.

The power conversion output plan creation and execution unit 301 then controls the DC voltage conversion and output device 8 so that the DC voltage conversion and output device 8 outputs current I8out(x) corresponding to a maximum value of the power conversion efficiency when the timing at which the power generator 6 generates power is detected via the power generator information receiver 401 (t=x).

Figure 5:
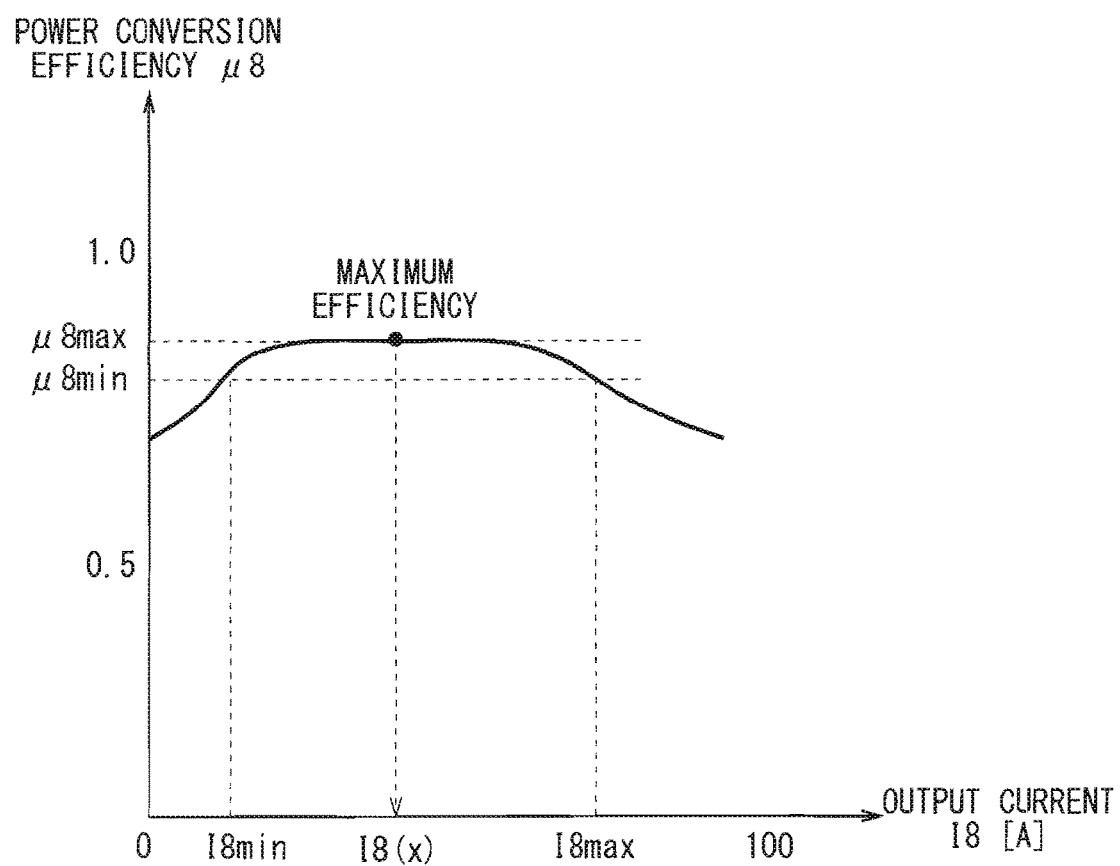
FIG. 5 shows the relation between output current of a DC voltage conversion and output device and power conversion efficiency.

More specifically, the power conversion efficiency μ8 of the DC voltage conversion and output device 8 is predetermined in accordance with the output current as shown in FIG. 5, and the above-mentioned value of the output current I8out is a value corresponding to the maximum value of the power conversion efficiency μ8.

That is to say, in FIG. 5, the horizontal axis and the vertical axis respectively represent the output current I8 and the power conversion efficiency μ8, and the value of the power conversion efficiency μ8 varying with a change of the output current I8 is shown. The maximum value of the power conversion efficiency μ8 is represented by maximum efficiency μ8max in FIG. 5.

In the above-mentioned description, the value of the output current I8out(x) is a value of current corresponding to the maximum value of the power conversion efficiency μ8. In this case, however, the value of current that can be output is limited, and thus a predetermined range of the power conversion efficiency, e.g., μ8min<μ8<μ8max shown in FIG. 5, between the maximum value (μ8max) of the power conversion efficiency and a value (μ8min) of the power conversion efficiency that is lower than the maximum value by a predetermined value may be determined, and the DC voltage conversion and output device 8 may be controlled to output current within the range (current within the range of I8min to I8max in FIG. 5).

Through such control, limitation of the value of current that can be output from the DC voltage conversion and output device 8 can be suppressed.

It is practical to set the value μ8min to be lower than the value μ8max by 5% to 10%, for example.

<Effects>

As described above, in the vehicle power management system according to Embodiment 3, the power conversion loss caused when the DC voltage conversion and output device 8 supplies power generated by the power generator 6 to the electrical load device group 10 is reduced to extend the cruising range of the vehicle.

Embodiment 4

A vehicle power management system in Embodiment 4 according to the present invention is described next. In the vehicle power management systems in Embodiments 1 to 3, the power conversion output plan creation and execution unit 301 controls the electrical load device group 10 that uses the low-voltage storage device 9 as a power supply, but, as for the electrical loads, an air conditioner 52 is taken as an example of a high-power supply voltage electrical load device (excluding the drive assembly 5) that uses the high-voltage storage device 7 as a power supply as shown in FIG. 1.

In a case of a vehicle including such a high-power supply voltage electrical load device, the drive assembly 5 and the air conditioner 52 draw large power of several kilowatts to tens of kilowatts from the high-voltage storage device 7, and a value of current output from the high-voltage storage device 7 at the time can be tens of amperes.

In a case where electrical resistance produced when the drive assembly 5 or the air conditioner 52 draws power Pout from the high-voltage storage device 7 having a voltage V (volts) is represented by R (ohms), the value of the current is expressed as I=P/V (amperes), and power generating Joule heat of $Q=RI^2$ (watts) is generated as loss power.

The Joule heat Q is also generated in a vehicle in which the high-voltage storage device 7 can be charged with power Pin generated by the power generator 6.

The above-mentioned electrical resistance R includes all or part of electrical resistance produced at charge or discharge between the high-voltage storage device 7 and the drive assembly 5, the air conditioner 52, or the power generator 6, such as internal resistance of the high-voltage storage device 7, and resistance in wiring connecting the high-voltage storage device 7 and the drive assembly 5, the air conditioner 52, or the power generator 6, and resistance in a contactor.

Described in Embodiment 4 is a vehicle power management system 200 that includes an air conditioning output plan creation and execution unit 501 that controls output of the air conditioner 52 to reduce loss power (e.g., Joule heat Q) generated at discharge or charge of the high-voltage storage device 7 in the vehicle in which the air conditioner 52 is connected to the high-voltage storage device 7 as the high-power supply voltage electrical load device other than the drive assembly 5, and the power generator 6 is connected to the high-voltage storage device 7 as a charge device.

<Device Configuration>

Figure 6:
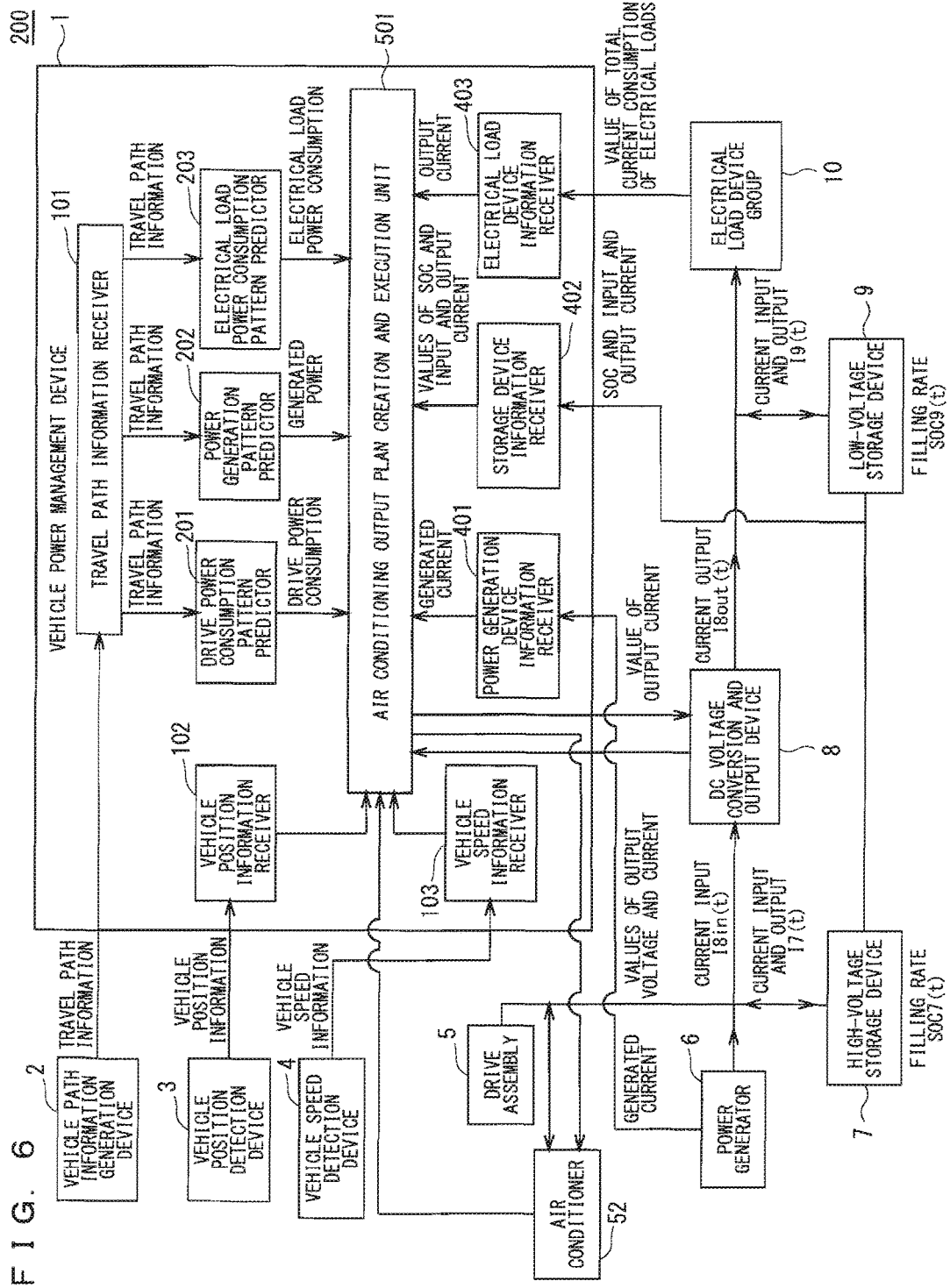
FIG. 6 is a block diagram showing the configuration of a vehicle power management system in Embodiment 4 according to the present invention.

The configuration of the vehicle power management system 200 in Embodiment 4 is described with use of FIG. 6. In FIG. 6, components that are the same as those of the vehicle power management system 100 described with use of FIG. 1 bear the same reference signs as those of the vehicle power management system 100, and description thereof is omitted.

The vehicle power management system 200 in Embodiment 4 includes the air conditioning output plan creation and execution unit 501 in place of the power conversion output plan creation and execution unit 301 of the vehicle power management system 100 shown in FIG. 1, and further includes the air conditioner 52 that adjusts temperature inside the vehicle in accordance with air conditioning output plan information (upper limit temperature, lower limit temperature, target temperature, and a control time) provided by the air conditioning output plan creation and execution unit 501. Although the air conditioning output plan creation and execution unit 501 is included in place of the power conversion output plan creation and execution unit 301 in the above-mentioned description, the power conversion output plan creation and execution unit 301 may additionally be included. This means that the system may include the power conversion output plan creation and execution unit 301 and the air conditioning output plan creation and execution unit 501.

The air conditioning output plan creation and execution unit 501 creates the air conditioning output plan information (the upper limit temperature, the lower limit temperature, the target temperature, the control time, and a value of discharge limit) based on the prediction results (drive power consumption, generated power, and electrical load power consumption) acquired by the respective predictors and device information (power generator information, storage device information, and electrical load device information) output from the respective device information receivers, and controls the air conditioner 52 based on the created output plan information. On the other hand, the air conditioner 52 provides information on temperature inside the vehicle, temperature outside the vehicle, preset temperature, and power consumption to the air conditioning output plan creation and execution unit 501.

<Operation>

Specific operation of the air conditioning output plan creation and execution unit 501 is described next with use of FIGS. 7 and 8.

Figure 7:
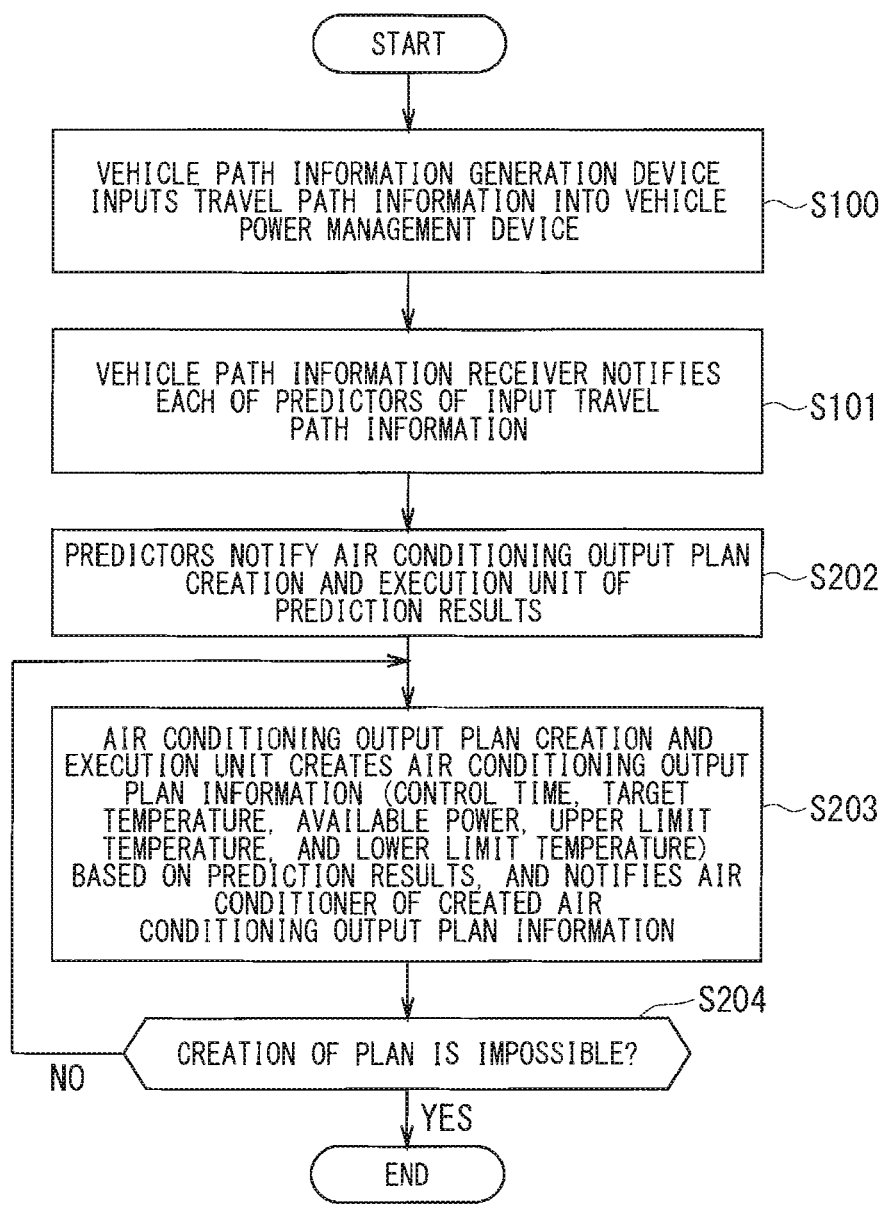
FIG. 7 is a flowchart for describing operation of the vehicle power management system in Embodiment 4 according to the present invention.
Figure 8:
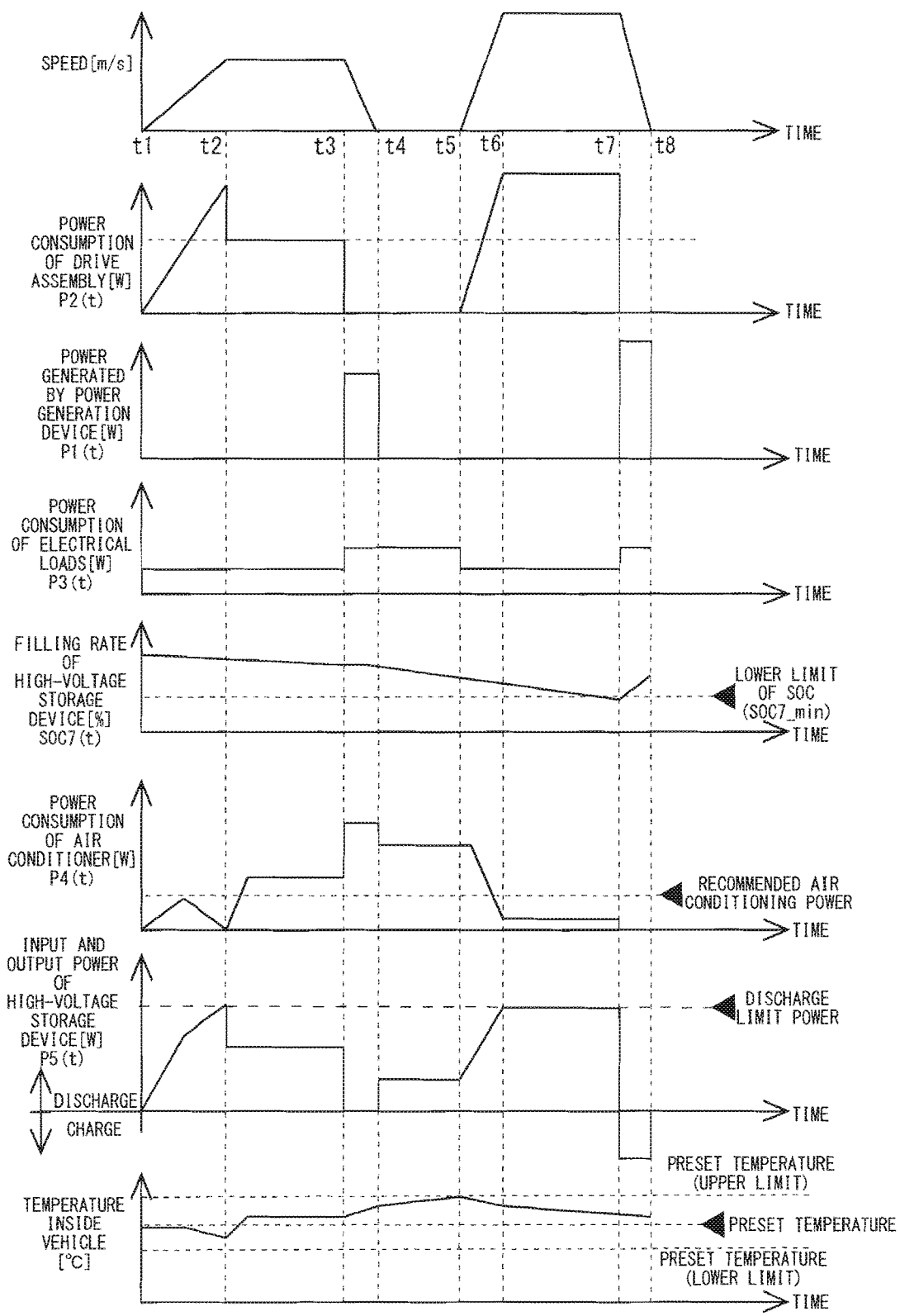
FIG. 8 is a timing chart for describing an air conditioning output control method according to Embodiment 4.

FIG. 7 is a flow chart for describing air conditioning output plan creation and execution processing performed by the vehicle power management device 1, and FIG. 8 is a timing chart for describing an air conditioning output control method based on an air conditioning output plan. FIG. 8 shows a timing chart indicating a change of the speed of the vehicle over time, a timing chart indicating a change of power consumption of the drive assembly 5 over time, a timing chart indicating a change of power generated by the power generator 6 over time, a timing chart indicating a change of power consumption of the electrical load device group 10 over time, a timing chart indicating a change of a charging rate of the high-voltage storage device 7 over time, a timing chart indicating a change of power consumption of the air conditioner 52 over time, a timing chart indicating a change of input and output power of the high-voltage storage device 7 over time, and a timing chart indicating a change of the temperature inside the vehicle over time.

In FIG. 7, steps S202 to S204 are performed in place of steps S102 to S104 in the method for use in the power conversion output plan creation and execution unit 301 for creating the power conversion output plan described with use of FIG. 2. The following describes a flow of processes in step S202 to S204.

First, as in step S102 in Embodiment 1, the drive power consumption pattern predictor 201, the power generation pattern predictor 202, and the electrical load power consumption pattern predictor 203 respectively predict the drive power consumption, the generated power, and the electrical load power consumption based on the travel path information, and notify the air conditioning output plan creation and execution unit 501 of the prediction results (step S202).

In a case where the air conditioning output plan creation and execution unit 501 then creates the air conditioning output plan information (the upper limit temperature, the lower limit temperature, the target temperature, the control time, and the value of the discharge limit) based on the prediction results, the air conditioning output plan creation and execution unit 501 notifies the air conditioner 52 of the created information (step S203).

On the other hand, in a case where the air conditioning output plan creation and execution unit 501 cannot create the air conditioning output plan information in step S203, the air conditioning output plan creation and execution unit 501 notifies the air conditioner 52 that the plan cannot be created (of information indicating that creation of the plan is impossible), and a series of processes is completed (S204). On the other hand, in the case where the air conditioning output plan information can be created, processes in and after step S203 are repeated (step S204).

In a case where the air conditioner 52 is notified of the air conditioning output plan information by the air conditioning output plan creation and execution unit 501, the air conditioner 52 outputs conditioned air in accordance with the air conditioning output plan information as input. In a case where the air conditioner 52 is notified that the plan cannot be created (of the information indicating that creation of the plan is impossible), the air conditioner 52 performs predetermined operation (air conditioning operation that the air conditioner 52 itself usually performs).

A method for creating the air conditioning output plan information according to Embodiment 4 is described herein. As in Embodiment 1, the vehicle position information is input from the vehicle position detection device 3 to the vehicle position information receiver 102, the vehicle speed information is periodically input from the vehicle speed detection device 4 to the vehicle speed information receiver 103, and the air conditioning output plan creation and execution unit 501 can respectively acquire information on the position of the vehicle and information on the speed of the vehicle from the vehicle position information receiver 102 and the vehicle speed information receiver 103 at any time.

Similarly, a value of current at power generation is input from the power generator 6 to the power generator information receiver 401, and SOC7(t) and a value of current input and output I7(t) are input from the high-voltage storage device 7 and SOC9(t) and a value of current input and output I9(t) are input from the low-voltage storage device 9 to the storage device information receiver 402.

The air conditioning output plan creation and execution unit 501 can acquire the temperature inside the vehicle, the temperature outside the vehicle, the preset temperature, and the power consumption from the air conditioner 52 periodically or when these values are changed. The air conditioning output plan creation and execution unit 501 can respectively acquire a timing of power generation and the value of current generated by the power generator 6, the values of SOC and the values of input and output current of the high-voltage storage device 7 and the low-voltage storage device 9, and the value of total current consumption of the electrical load device group 10 from the power generator information receiver 401, the storage device information receiver 402, and the electrical load device information receiver 403.

The air conditioning output plan creation and execution unit 501 outputs the air conditioning output plan information (the upper limit temperature, the lower limit temperature, the target temperature, the control time, and the value of the discharge limit) to the air conditioner 52, and the air conditioner 52 can output the temperature inside the vehicle or the temperature outside the vehicle to the air conditioning output plan creation and execution unit 501.

Rated output of the high-voltage storage device 7 is represented by P7Max, and the air conditioning output plan creation and execution unit 501 has this value in advance.

The generated power, the drive power consumption, and the electrical load power consumption predicted in step S202 are herein represented by P1(t), P2(t), and P3(t), respectively, and a condition under which the air conditioner uses the generated power and a condition under which the air conditioner does not use the generated power are described.

<Condition Under which Air Conditioner Uses Generated Power>

The air conditioning output plan creation and execution unit 501 creates the output plan information for the air conditioner 52 in such a manner that the air conditioner 52 directly uses the generated power of the prediction result P1(t) without charging the high-voltage storage device 7 with the generated power of the prediction result P1(t) in a case where the sum of the electrical load power consumption of the prediction result P3(t) and the power consumption P4(t) of the air conditioner 52 is equal to or smaller than the value of the generated power of the prediction result P1(t) at each time as shown in FIG. 8, for example. The above-mentioned condition is expressed by the following formula (10).

$$P4(t)+P3(t)-P1(t) \leq 0 \qquad (10)$$

The power generator 6 in the present embodiment anticipates power generation with use of a regenerative brake at deceleration of the vehicle, and thus power consumption of the drive assembly 5 and power generation of the power generator 6 do not occur simultaneously.

<Condition Under which Air Conditioner does not Use Generated Power>

On the other hand, the output plan information is created in such a manner that the generated power is not used in air conditioning by setting the power consumption P4(t) of the air conditioner 52 to zero, and the high-voltage storage device 7 is preferentially charged with the power P1(t) generated by the power generator 6 in a case where SOC7(n) of the high-voltage storage device 7 is equal to or smaller than a lower limit SOC7min of SOC7 even if the above-mentioned formula (10) is satisfied. In this case, the above-mentioned condition is expressed by the following formulas (11) to (13) provided that the electrical load power consumption P3(t) may also be set to zero.

$$SOC7(n) \leq SOC7\text{min} \qquad (11)$$

$$P1(t) \geq 0 \qquad (12)$$

$$P4(t)=0 \text{(or } P4(t)=0 \text{ and } P3(t)=0) \qquad (13)$$

<Air Conditioning Output Plan Information>

Details of the air conditioning output plan information created by the air conditioning output plan creation and execution unit 501 are described next. The air conditioning output plan information mainly includes two elements, namely, a temperature condition (the upper limit temperature and the lower limit temperature) and a control condition (the target temperature and the control time).

<Temperature Condition>

As described above, in the present embodiment, there are the case where the air conditioner 52 is used and the case where the air conditioner 52 is not used, and temperature inside the vehicle changes as the air conditioner 52 is not used at constant output.

The air conditioning output plan creation and execution unit 501 thus creates the air conditioning output plan in such a manner that the air conditioner 52 performs air conditioning control (heating or cooling) so that the upper limit temperature (e.g., 22° C. in a case where the preset temperature is 20° C.) and the lower limit temperature (e.g., 18° C. in the case where the preset temperature is 20° C.) are set in advance based on the preset temperature (e.g., temperature that a driver sets via an external input device such as a temperature setting dial), and the temperature inside the vehicle is maintained within the above-mentioned temperature range (18° C. to 22° C. inclusive) for a predetermined time period (e.g., a predetermined time period such as five minutes or a time period until the vehicle is expected to stop at the next intersection and the like).

The upper limit temperature and the lower limit temperature may respectively be calculated as the preset temperature+A and the preset temperature−B with use of predetermined values A and B provided by the air conditioning output plan creation and execution unit 501 to the preset temperature acquired from the air conditioner 52, or may have any values input via the external input device (e.g., an input device included in the air conditioner 52) such as the temperature setting dial.

In the latter case (in the case where the external input device is used), the air conditioner 52 can directly acquire the upper limit temperature and the lower limit temperature without using the air conditioning output plan creation and execution unit 501, eliminating the need to input the upper limit temperature and the lower limit temperature from the air conditioning output plan creation and execution unit 501.

<Control Time and Target Temperature>

The control time and the target temperature included in the air conditioning output plan information output from the air conditioning output plan creation and execution unit 501 are described next with use of FIG. 8.

The air conditioning output plan is created by the air conditioning output plan creation and execution unit 501 in such a manner that air conditioning output is adjusted so that discharged power of the input and output power P5(t) of the high-voltage storage device 7 is equal to or smaller than a predetermined fixed value (discharge limit power shown in the timing chart indicating the input and output power of the high-voltage storage device 7 in FIG. 8).

Therefore, in a time period from time t1 to time t2 in which the vehicle accelerates and in a time period from time t5 to time t7 in which the vehicle accelerates and then maintains traveling at a high speed, the drive power consumption P2(t) exceeds the discharge limit power, and thus the power consumption P4(t) of the air conditioner is reduced.

Furthermore, since the power consumption P4(t) of the air conditioner 52 is set zero in the case where SOC7(n) of the high-voltage storage device 7 is equal to or smaller than the lower limit SOC7min of SOC7 based on the above-mentioned "condition under which the air conditioner does not use the generated power", in the timing chart indicating the charging rate of the high-voltage storage device in FIG. 8, the generated power P1(t) is used as power to charge the high-voltage storage device 7 in a time period from time t7 to time t8 in which SOC7(n) of the high-voltage storage device 7 is equal to or smaller than the lower limit SOC7min.

In a time period from time t5 to time t8, the air conditioning output (approximately equivalent to the power consumption P4(t) of the air conditioner) is smaller than power (recommended air conditioning power shown in the timing chart indicating the power consumption of the air conditioner in FIG. 8) required to maintain the preset temperature, and thus the temperature inside the vehicle can no longer be maintained and decreases as shown in the timing chart indicating the temperature inside the vehicle in FIG. 8.

The above-mentioned power (recommended air conditioning power) required to maintain the preset temperature of the air conditioner 52 inside the vehicle has the same meaning as air conditioning output Qair [J] at which a change ΔTmp in temperature inside the vehicle described later is 0, and is calculated by the air conditioning output plan creation and execution unit 501 using a method described below.

In a case where the air conditioner 52 has a function to calculate the air conditioning output Qair [J](equivalent to the recommended air conditioning power) at which the change ΔTmp in temperature inside the vehicle is 0, the air conditioning output plan creation and execution unit 501 acquires the recommended air conditioning power from the air conditioner 52.

The air conditioning output plan creation and execution unit 501 creates the air conditioning output plan in such a manner that the temperature inside the vehicle reaches the upper limit temperature in a time period from time t1 to time t5 to thereby achieve air conditioning output as described above, so that the temperature inside the vehicle reaches the upper limit temperature at time t5, and satisfies the above-mentioned temperature condition (18° C. to 22° C. inclusive) in a period from time t5 to time t8 following the time period from time t1 to time t5.

In this case, the air conditioning output plan creation and execution unit 501 creates the air conditioning output plan information such that the time period from time t1 to time t5 is the "control time" and the temperature (upper limit temperature) at time t5 is the "target temperature", and notifies the air conditioner 52 of the created air conditioning output plan information.

<Air Conditioning Output Control Method for Use in Air Conditioner 52>

An air conditioning output control method for use in the air conditioner 52 is described next with use of FIG. 8. The air conditioner 52 can acquire the input and output power P5(t) of the high-voltage storage device 7 from the air conditioning output plan creation and execution unit 501 or the high-voltage storage device 7.

The air conditioner 52 also controls output so that the power discharged from the high-voltage storage device 7 is equal to or smaller than the predetermined fixed value (discharge limit power), and the air conditioning output plan creation and execution unit 501 notifies the air conditioner 52 of the discharge limit power as the air conditioning output plan information at a given timing.

With such configuration, in a time period (including a time period in which the vehicle stops) from time t4 to time t5 in FIG. 8, the air conditioner 52 increases the air conditioning output as the power discharged from the high-voltage storage device 7 is small (is smaller than the discharge limit power). In a time period from time t2 to time t3 in FIG. 8, however, the air conditioning output is reduced as the power discharged from the high-voltage storage device 7 is relatively large (compared to that in the time period from time t4 to time t5).

In the time period (including the time period in which the vehicle accelerates) from time t1 to time t2 in FIG. 8, the air conditioner 52 maintains the air conditioning output at or below the recommended air conditioning power so that the power discharged from the high-voltage storage device 7 does not exceed the discharge limit power.

In a time period (including a time period in which the vehicle decelerates) from time t3 to time t4 in FIG. 8, power is generated by the power generator 6, such as a regenerative motor, but SOC7(n) of the high-voltage storage device 7 exceeds the lower limit SOC7min and the above-mentioned formula (10) is satisfied in this time period, and thus all the power generated by the power generator 6 is consumed by the air conditioner 52, and is not used to charge the high-voltage storage device 7. As a result, the air conditioning output reaches a maximum value (peak).

On the other hand, in the time period (including a time period in which the vehicle decelerates) from time t7 to time t8 in FIG. 8, power is generated by the power generator 6, such as the regenerative motor, but SOC7(n) of the high-voltage storage device 7 is equal to or smaller than the lower limit SOC7min in this time period, and thus all the power generated by the power generator 6 is not consumed by the air conditioner 52, but is used to charge the high-voltage storage device 7. In this case, the power consumption P4(t) of the air conditioner 52 is set to zero.

Through control described above, the maximum value (peak) of the power discharged from the high-voltage storage device 7 can be suppressed to suppress the value of current at discharge and to reduce the power loss, such as Joule heat, caused at discharge.

The air conditioner can directly use power generated by the regenerative motor and the like to reduce the amount of power stored in the high-voltage storage device 7 and used, and, as a result, operation to charge and discharge the high-voltage storage device 7 can be reduced to reduce the power loss caused at charge and discharge.

<Effects>

As described above, in the vehicle power management system according to Embodiment 4, the air conditioner 52 controls the air conditioning output so that the power discharged from the high-voltage storage device 7 is equal to or smaller than the predetermined fixed value (discharge limit power) based on the air conditioning output plan information provided by the air conditioning output plan creation and execution unit 501 to suppress the value of current at discharge of the high-voltage storage device 7, reduce the power loss caused at discharge, and extend the cruising range of the vehicle.

The air conditioner 52 also directly uses power generated by the power generator 6 without using the high-voltage storage device 7 to reduce the power loss caused at discharge and to extend the cruising range of the vehicle compared to a case where the high-voltage storage device 7 is once charged with the generated power, and is discharged so that the air conditioner 52 uses the generated power.

The present embodiment is based on the premise that the air conditioning output plan creation and execution unit 501 can calculate the temperature inside the vehicle at time t=n.

Specifically, in a case where heat capacity of the vehicle is represented by C [J/K], the amount of heat output from the air conditioner 52 to the vehicle at time t is represented by Qair [J], and the amount of heat radiated or flowing from the vehicle to the outside the vehicle at time t is represented by Qescape [J] (radiation of heat to the vehicle is indicated by a positive value, and absorption of heat into the outside the vehicle is indicated by a negative value), a change ΔTmp in temperature inside the vehicle is expressed by the following formula (14) provided that thermal energy is uniformly dispersed.

$$\Delta Tmp = (Q\text{air}[J] - Q\text{escape}[J]) \div C [K] \quad (14)$$

The amount of heat Qair [J] is a value known from a spec of the air conditioner 52, and is uniquely determined from the power consumption P4(t) of the air conditioner 52.

In a case where the temperature inside the vehicle and the temperature outside the vehicle are respectively represented by Tmp_indoor and Tmp_outdoor [K], the amount of heat Qescape [J] radiated or flowing from the vehicle to the outside the vehicle is expressed by the following formula (15) from thermal conductivity $\lambda$ [W/(m·K)] and a surface area S [m²] of the vehicle and an average thickness D [m] of a body of the vehicle.

$$Q\text{escape} = \{\lambda \cdot (Tmp\_indoor - Tmp\_outdoor) \cdot S\} / D [J] \quad (15)$$

The air conditioning output plan creation and execution unit 501 can acquire the temperature inside the vehicle Tmp_indoor and the temperature outside the vehicle Tmp_outdoor from the air conditioner 52.

Embodiment 5

In Embodiment 4 described above, the air conditioning output plan creation and execution unit 501 controls output of the air conditioner 52 and an output timing to reduce the power loss caused at charge and discharge of the high-voltage storage device 7, but a case where a device, such as a hot-water heater, having a mechanism for storing thermal energy in the device and releasing the stored thermal energy is used as the air conditioner 52 is not supported.

Figure 9:
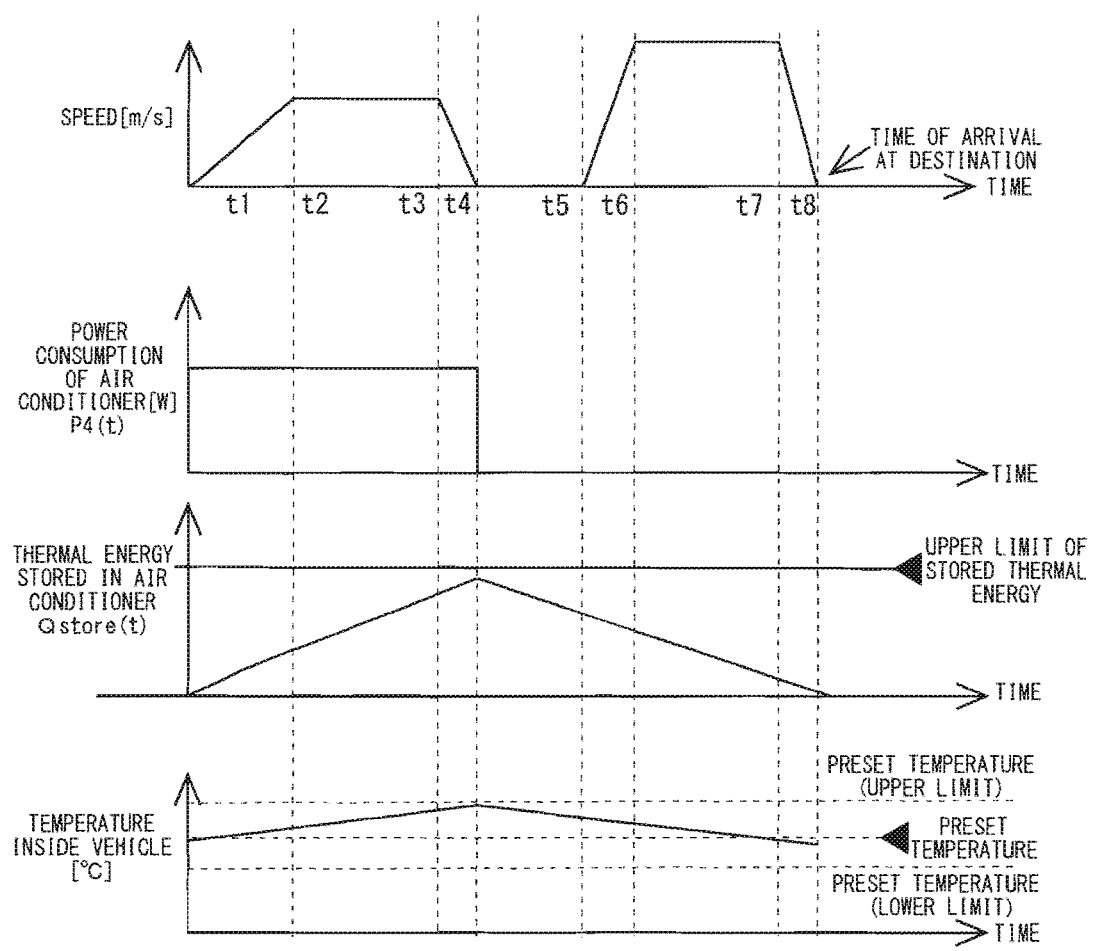
FIG. 9 is a timing chart for describing an air conditioning output control method according to Embodiment 5.

In Embodiment 5, an air conditioning output control method for use in the vehicle power management system 200 in a case where the air conditioner 52 is a device that can store thermal energy therein and radiate the thermal energy is described with use of FIG. 9. FIG. 9 is a timing chart for describing the air conditioning output control method in Embodiment 5, and corresponds to FIG. 8, but only shows the timing chart indicating the change of the speed of the vehicle over time, the timing chart indicating the change of power consumption of the air conditioner 52 over time, a timing chart indicating a change of thermal energy stored in the air conditioner 52 over time, and the timing chart indicating the change of the temperature inside the vehicle over time to briefly describe the feature of the present embodiment.

The vehicle power management system 200 has the same configuration as the vehicle power management system 200 shown in FIG. 6, but differs from the vehicle power management system 200 shown in FIG. 6 in that the air conditioner 52 is a device that can store thermal energy Qstore(t).

Specifically, the air conditioner 52 is a device, such as a hot-water heater, boiling a medium (water in this case) with use of an electric heater to generate hot water, and warm the vehicle through radiation of heat from the hot water.

With such configuration, as shown in FIG. 9, supply of power (power to generate hot water in this case) to the air conditioner 52 is stopped at time t4, and stored thermal energy of hot water having been warmed in a time period from time t1 to time t4 is radiated to the vehicle from time t4 to time t8 at which the vehicle arrives at the destination to maintain the temperature inside the vehicle between the upper limit temperature and the lower limit temperature almost without consuming power in the air conditioner 52 and to thereby reduce the power consumption of the air conditioner 52.

A specific method for calculating the stored thermal energy and radiating heat to the vehicle is described next. Thermal energy Qstore(t) of hot water is expressed by the following formula (16) from the weight M [g] of the hot water, specific heat ρ [J/g·k], and temperature Tmp_water(t) [K] of the hot water.

$$Q\text{store}(t) = \rho \cdot M \cdot Tmp\_\text{water}(t) [J] \quad (16)$$

The temperature Tmp_water(t) of the hot water is herein temperature of the hot water at time t, and can be acquired by the air conditioning output plan creation and execution unit 501 from the air conditioner 52. The weight M [g] of the hot water and the specific heat ρ [J/g·k] are known values that can be acquired in advance from the spec and the like of the air conditioner 52. Although temperature of a portion, referred to as a heater core, of the heater facing air inside the vehicle is actually different from the temperature of the hot water, they are herein treated as the same temperature to simplify description.

<Condition Under which Stored Thermal Energy is Radiated>

Radiation of heat from the hot water to the vehicle is effective in a case where the temperature inside the vehicle Tmp_indoor is lower than the temperature Tmp_water(t) of the hot water, and a condition under which heat is radiated to the vehicle is expressed by the following formula (17).

$$Tmp\_\text{indoor} < Tmp\_\text{water}(t) \quad (17)$$

<Method for Radiating Stored Thermal Energy>

In order to radiate the stored thermal energy, in the air conditioner 52, power supply to the heater for warming the hot water is stopped, and warm air is sent to the vehicle by rotating only a heat radiation fan.

<Method for Determining Timing of Radiation of Stored Thermal Energy>

A method for use in the air conditioning output plan creation and execution unit 501 for determining time to start radiation of the stored thermal energy is described next.

Specifically, a case where the above-mentioned condition (formula (17)) under which the stored thermal energy is radiated is satisfied, and it takes a predetermined time or less to arrive at the destination is described.

The air conditioner 52 herein acquires time of arrival at the destination (time acquired in advance from the vehicle path information generation device 2) from the air conditioning output plan creation and execution unit 501, and can acquire the temperature inside the vehicle Tmp_indoor and the temperature outside the vehicle Tmp_outdoor [K] as in Embodiment 4.

The air conditioner 52 has, in advance, information on a heat radiation coefficient ΔQ [J/s] used to calculate a time (heat radiation time Temit) for which radiation of the stored thermal energy can be continued in accordance with a value of a difference ΔT (Tmp_indoor−Tmp_outdoor) between the temperature inside the vehicle and the temperature outside the vehicle, and calculates the heat radiation time Temit by the following formula (18).

$$T\text{emit} = Q\text{store}(t) \div \Delta Q \quad (18)$$

The relation between the difference ΔT ([K]) between the temperature inside the vehicle and the temperature outside the vehicle and the heat radiation coefficient ΔQ is expressed as shown in Table 1 below.

TABLE 1

| DIFFERENCE ΔT [K] BETWEEN TEMPERATURE INSIDE AND OUTSIDE VEHICLE | HEAT RADIATION COEFFICIENT ΔQ [J/s] |
|---|---|
| 1 | 10 |
| 2 | 30 |
| 3 | 40 |
| 4 | 50 |
| 5 | 100 |
| : | : |

As can be seen from Table 1 shown above, the heat radiation coefficient ΔQ increases with increasing difference ΔT between the temperature inside the vehicle and the temperature outside the vehicle. The heat radiation coefficient ΔQ in the present embodiment is a value correlating with the amount of thermal energy radiated per unit time of the vehicle acquired from an experimental value and the like, but may be acquired through calculation as with the amount of heat Qescape [J] radiated or flowing from the vehicle to the outside the vehicle described in Embodiment 4.

As described above, the air conditioner 52 can start radiation of heat the heat radiation time Temit (predetermined time) before time of arrival at the destination to provide air conditioning (heating or cooling) in the vehicle through use of the stored thermal energy.

Although a case where the air conditioner 52 provides heating is described above, the above-mentioned description is also applicable to a case where cooling is provided through use of latent heat of fusion as the stored thermal energy.

That is to say, in a case where a regenerating agent (e.g., cold water) is used in place of hot water, the condition under which the stored thermal energy is radiated is expressed by the following formula (19), and the method for determining the timing of radiation of the stored thermal energy and the like are the same as those in heating although the formula (19) is the opposite of the formula (17).

$$Tmp\_indoor > Tmp\_water(t) \qquad (19)$$

<Effects>

As described above, in the vehicle power management system according to Embodiment 5, the air conditioner 52 radiates the thermal energy stored therein to the vehicle before the time of arrival at the destination to reduce power consumed by the air conditioner 52 the predetermine time before the time of arrival at destination and to thereby extend the cruising range of the vehicle.

While the present invention has been described in detail, the foregoing description is in all aspects illustrative and not restrictive. It is therefore understood that numerous modifications that have not been described can be devised without departing from the scope of the present invention.

The invention claimed is:

1. A vehicle power management device for managing: a vehicle path information generation device that generates a travel path of a vehicle; a drive assembly that consumes power to drive said vehicle; a power generator; a plurality of electrical loads; a first storage device that stores therein power for driving said vehicle; a second storage device that stores therein power for operation of said electrical loads; and a DC voltage conversion and output device that converts voltage of the power stored in said first storage device to generate DC voltage for operation of said electrical loads, and outputs the DC voltage, and for controlling a flow of electric energy in said vehicle, wherein said vehicle power management device controls output of said DC voltage conversion and output device so that a filling rate of said second storage device is between a lower limit and an upper limit of a range in which a charge and discharge speed of said second storage device is equal to or higher than a predetermined value, said vehicle power management device further managing an air conditioner that is supplied with power from said first storage device, stores therein thermal energy generated by the supplied power, and provides air conditioning through use of the stored thermal energy, wherein said vehicle power management device creates an air conditioning output plan such that, a predetermined time before time of arrival at a destination acquired from said vehicle path information generation device, power supply from said first storage device to said air conditioner is stopped, and radiation of the thermal energy stored in said air conditioner is started.

2. The vehicle power management device according to claim 1, wherein said vehicle power management device controls output of said DC voltage conversion and output device so that said DC voltage conversion and output device outputs current corresponding to a maximum value of power conversion efficiency of said DC voltage conversion and output device.

3. The vehicle power management device according to claim 1, wherein said vehicle power management device controls output of said DC voltage conversion and output device so that said DC voltage conversion and output device outputs current having a value between a first current value corresponding to a first value of power conversion efficiency of said DC voltage conversion and output device and a second current value corresponding to a second value of the power conversion efficiency, the first value being a maximum value of the power conversion efficiency, the second value being lower than the first value by a predetermined value.

4. The vehicle power management device according to claim 1, wherein said predetermined time is specified by a time for which radiation of the thermal energy stored in said air conditioner can be continued.

5. A vehicle power management device for managing: a vehicle path information generation device that generates a travel path of a vehicle; a drive assembly that consumes power to drive said vehicle; a power generator; a plurality of electrical loads; a first storage device that stores therein power for driving said vehicle; a second storage device that stores therein power for operation of said electrical loads; and a DC voltage conversion and output device that converts voltage of the power stored in said first storage device to generate DC voltage for operation of said electrical loads, and outputs the DC voltage, and for controlling a flow of electric energy in said vehicle, said vehicle power management device comprising:

a drive power consumption pattern predictor that predicts drive power consumption based on said travel path generated by said vehicle path information generation device, the drive power consumption being power consumed by said drive assembly;

a power generation pattern predictor that predicts power generated by said power generator; and an electrical load power consumption pattern predictor that predicts electrical load power consumption that is power consumed by said electrical loads, wherein said vehicle power management device stops said DC voltage conversion and output device in a case that a difference between said generated power predicted by said power generation pattern predictor and the sum of said drive power consumption predicted by said drive power consumption pattern predictor and said electrical load power consumption predicted by said electrical load power consumption pattern predictor is larger than a threshold set based on a rated output of said first storage device.

6. The vehicle power management device according to claim 5, wherein said vehicle power management device controls output of said DC voltage conversion and output device so that said DC voltage conversion and output device outputs current corresponding to a maximum value of power conversion efficiency of said DC voltage conversion and output device.

7. The vehicle power management device according to claim 5, wherein said vehicle power management device controls output of said DC voltage conversion and output device so that said DC voltage conversion and output device outputs current having a value between a first current value corresponding to a first value of power conversion efficiency of said DC voltage conversion and output device and a second current value corresponding to a second value of the power conversion efficiency, the first value being a maximum value of the power conversion efficiency, the second value being lower than the first value by a predetermined value.

8. The vehicle power management device according to claim 5, further managing an air conditioner that is supplied with power from said first storage device, wherein said vehicle power management device creates an air conditioning output plan based on said drive power consumption predicted by said drive power consumption pattern predictor, said generated power predicted by said power generation pattern predictor, and said electrical load power consumption predicted by said electrical load power consumption pattern predictor, the air conditioning output plan being created such that said air conditioner adjusts air conditioning output so that power discharged from said first storage device is equal to or smaller than a predetermined threshold, and said air conditioner directly uses said generated power under a predetermined condition.

9. The vehicle power management device according to claim 8, wherein said predetermined condition is that the sum of power consumption of said air conditioner and said electrical load power consumption is equal to or smaller than said generated power, and state of charge of said first storage device exceeds a predetermined lower limit.

10. The vehicle power management device according to claim 5, further managing an air conditioner that is supplied with power from said first storage device, stores therein thermal energy generated by the supplied power, and provides air conditioning through use of the stored thermal energy, wherein said vehicle power management device creates an air conditioning output plan such that, a predetermined time before time of arrival at a destination acquired from said vehicle path information generation device, power supply from said first storage device to said air conditioner is stopped, and radiation of the thermal energy stored in said air conditioner is started.

11. The vehicle power management device according to claim 10, wherein said predetermined time is specified by a time for which radiation of the thermal energy stored in said air conditioner can be continued.

* * * * *